(12) United States Patent
Osmanis et al.

(10) Patent No.: US 11,796,817 B2
(45) Date of Patent: Oct. 24, 2023

(54) OPTICAL ARRANGEMENT FOR EXPANDING AND UNIFORMIZING LIGHT BEAMS

(71) Applicant: Lightspace Group, Inc., Sunnyvale, CA (US)

(72) Inventors: Ilmars Osmanis, Mārupes novads (LV); Ugis Gertners, Riga (LV); Kriss Osmanis, Babītes nov. (LV); Martins Narels, Riga (LV); Marcis Greitans, Garkalnes Novads (LV); Ainars Ozols, Siguldas novads (LV); Sandra Balode, Ogres nov. (LV); Roberts Zabels, Riga (LV)

(73) Assignee: Lightspace Group, Inc., Sunnyvale, CA (US)

( * ) Notice: Subject to any disclaimer, the term of this patent is extended or adjusted under 35 U.S.C. 154(b) by 104 days.

(21) Appl. No.: 17/581,169

(22) Filed: Jan. 21, 2022

(65) Prior Publication Data
US 2023/0236421 A1 Jul. 27, 2023

(51) Int. Cl.
*G02B 27/01* (2006.01)
*G02B 27/30* (2006.01)
(Continued)

(52) U.S. Cl.
CPC ....... *G02B 27/0172* (2013.01); *G02B 27/286* (2013.01); *G02B 27/30* (2013.01); *H04N 9/3152* (2013.01); *H04N 9/3167* (2013.01)

(58) Field of Classification Search
CPC .... G03B 21/145; G03B 21/208; G03B 21/56; G03B 21/604; G03B 21/2013;
(Continued)

(56) References Cited

U.S. PATENT DOCUMENTS 4,925,259 A 5/1990 Emmett
6,972,065 B1 12/2005 Arnold
(Continued)

FOREIGN PATENT DOCUMENTS

CN 1221817 C 10/2005
WO 2021122848 A1 6/2021

OTHER PUBLICATIONS

European Patent Office, International Search Report and Written Opinion of the International Searching Authority, International Application No. PCT/EP2023/050919, dated Jun. 16, 2023, 19 pages.

*Primary Examiner* — Sultan Chowdhury
(74) *Attorney, Agent, or Firm* — Ziegler IP Law Group

(57) ABSTRACT

An optical arrangement for expanding and uniformizing a beam of light, including a first optical member arranged to receive a collimated incoming light beam, from an incoming beam direction, with a first polarization, the first optical member configured to expand and uniformize the collimated incoming light beam along a first axis to form a first collimated light beam exiting therefrom in a first beam direction; a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction.

20 Claims, 7 Drawing Sheets

(51) Int. Cl.
*H04N 9/31* (2006.01)
*G02B 27/28* (2006.01)

(58) Field of Classification Search
CPC ............ G03B 21/2033; G03B 21/2053; G03B 21/2073; H04N 9/315; H04N 9/3102; H04N 9/3105; H04N 9/3141; H04N 9/3152; H04N 9/3155; H04N 9/3164; H04N 9/3167; G02B 27/017; G02B 27/0101; G02B 27/0172; G02B 27/0922; G02B 27/0944; G02B 27/28; G02B 27/30; G02B 27/42; G02B 27/286
See application file for complete search history.

(56) References Cited

U.S. PATENT DOCUMENTS

| | | |
|---|---|---|
| 2002/0036821 A1 | 3/2002 | Hollemann et al. |
| 2002/0036831 A1 | 3/2002 | Inoguchi et al. |
| 2013/0128611 A1 | 5/2013 | Akutsu et al. |
| 2018/0335629 A1 | 11/2018 | Cheng et al. |
| 2020/0264378 A1* | 8/2020 | Grant ...................... G02B 6/34 |
| 2020/0371387 A1 | 11/2020 | Gollier et al. |
| 2021/0278587 A1* | 9/2021 | Schowengerdt ......... G02B 6/12 |
| 2021/0318566 A1* | 10/2021 | Oh ................... G02F 1/133757 |

* cited by examiner

OPTICAL ARRANGEMENT FOR EXPANDING AND UNIFORMIZING LIGHT BEAMS

TECHNICAL FIELD

The present disclosure relates generally to optical systems and devices and more specifically, to an optical arrangement for expanding and uniformizing a beam of light.

BACKGROUND

In recent years, increasing growth in technology has led to rapid development of various types of systems, devices and/or processes, across a spectrum of fields including, but not limited to, simulation and application (i.e., extended reality (XR) including augmented reality (AR), virtual reality (VR), mixed reality (MR)), end-user industries (such as, education, retail, manufacturing, healthcare, media, entertainment and the like. Such systems or devices may be utilized by millions of users worldwide, such as by medical personnel or by self-employed by the users in a variety of scenarios such as medical check-ups, patient-care or hospitality, self-diagnosis via user and so forth. Typically, stereoscopic near-eye displays have been increasingly such as in, extended reality (XR) and other display systems for conveying a perceptually three-dimensional image. Nevertheless, in doing so not all essential visual cues are available.

Moreover, single focal plane displays are unable to address eye accommodations similar to natural viewing conditions and consequently induces vergence-accommodation conflicts and/or issues derived therefrom, namely a blurred vision, eyestrain, visual fatigue, cognitive issues, possibly nausea. To overcome this, next generation display architectures have been proposed. One such architecture relates to a solid-state multifocal display architecture, which forms images at multiple physical locations defined by a stack of optical diffuser elements. The stack forming diffusers that are liquid-crystal screen elements are switchable between highly transparent state and highly light diffusing state.

Currently, the image is projected onto the available diffuser elements via micro-projection unit having spatial light modulator and projection optics. Utilization of micro projection unit foresees a certain optical separation from the projection lens to the stack of diffuser elements to allow for image magnification. To introduce this distance, typically in the range of a few centimeters (cm) i.e., 4-11 cm, a space within a head-mounted near-eye display has to be reserved for facilitating increased overall footprint. Furthermore, often additional optical elements in the optical path between the projection lens and the diffuser stack is required for example folding mirrors, offset lens and other elements, all together with the micro-projection unit itself adding to the bulk and footprint of a near-eye display. Additionally, the projected image of such a projection unit is characterized by a relatively shallow depth of field degrading image quality across all diffuser elements of the screen stack. To counter this, the aperture of the projection lens as well as the light throughput and consequently brightness of the resultant image is varied. Still, existing systems and methods are extremely complex and requiring a plethora of optical elements and thus, the footprint reduction is miniscule, or the image quality might be reduced due to spread-out pixels.

Thus, in the light of the foregoing discussion, there exists a need for a technical solution overcoming mentioned limitations, namely an integrated multifocal image engine with reduced footprint and improved image characteristics such as, brightness and depth of field and an improved optical arrangement for expanding and uniformizing a beam of light.

SUMMARY

The present disclosure seeks to provide optical arrangement for expanding and uniformizing a beam of light. The present disclosure also seeks to provide a projector unit and a display apparatus for forming an image using the optical arrangement. An aim of the present disclosure is to provide a solution that overcomes at least partially the problems encountered in prior art.

In one aspect, the present disclosure provides an optical arrangement for expanding and uniformizing a beam of light, comprising:
 a first optical member arranged to receive a collimated incoming light beam, from an incoming beam direction, with a first polarization, the first optical member configured to expand and uniformize the collimated incoming light beam along a first axis to form a first collimated light beam exiting therefrom in a first beam direction; and
 a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction.

In another aspect, the present disclosure provides A projector unit, comprising:
 a light source configured to provide a collimated incoming light beam with a first polarization;
 an optical arrangement comprising:
  a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
  a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction; and
 a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization,
 wherein the second optical member is configured to transmit the reflected back second collimated light beam from the one or more active pixels with the second polarization therethrough, and to reflect the reflected back second collimated light beam from the one or more inactive pixels with the first polarization.

In yet another aspect, the present disclosure provides a display apparatus, comprising:

a light source configured to provide a collimated incoming light beam with a first polarization;
an optical arrangement comprising:
- a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
- a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction;

a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization;

a display member arranged in the direction opposite to the second beam direction with respect to the spatial light modulator, wherein the second optical member is configured to transmit the reflected back second collimated light beam from the one or more active pixels with the second polarization therethrough, and to reflect the reflected back second collimated light beam from the one or more inactive pixels with the first polarization, and wherein the display member is configured to receive the transmitted second collimated light beam through the second optical member, to generate an image thereat.

Embodiments of the present disclosure substantially eliminate or at least partially address the aforementioned problems in the prior art and enable the beam of light to be expanded and uniformized based on the requirements of the implementation and thereby enable the formation of a multi-focal image via the projector unit and the display apparatus in an efficient and effective manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
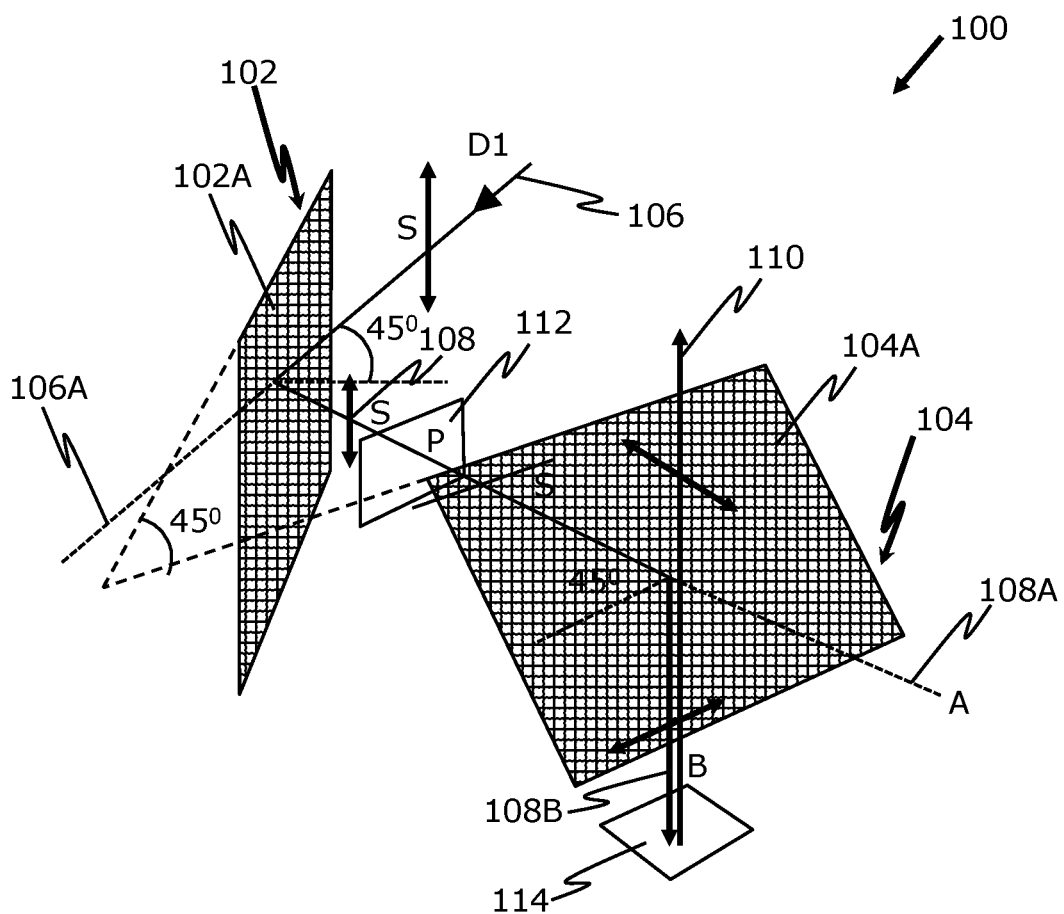
FIG. 1 is a schematic illustration of an optical arrangement for expanding and uniformizing a beam of light, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, the present disclosure provides an optical arrangement for expanding and uniformizing a beam of light, comprising:
- a first optical member arranged to receive a collimated incoming light beam, from an incoming beam direction, with a first polarization, the first optical member configured to expand and uniformize the collimated incoming light beam along a first axis to form a first collimated light beam exiting therefrom in a first beam direction; and
- a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction.

In another aspect, the present disclosure provides A projector unit, comprising:
- a light source configured to provide a collimated incoming light beam with a first polarization;
- an optical arrangement comprising:
  - a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
  - a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction; and
- a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization,
- wherein the second optical member is configured to transmit the reflected back second collimated light beam from the one or more active pixels with the second polarization therethrough, and to reflect the reflected back second collimated light beam from the one or more inactive pixels with the first polarization.

In yet another aspect, the present disclosure provides a display apparatus, comprising:
- a light source configured to provide a collimated incoming light beam with a first polarization;
- an optical arrangement comprising:
  - a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
  - a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction;
- a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization;
- a display member arranged in the direction opposite to the second beam direction with respect to the spatial light modulator,
- wherein the second optical member is configured to transmit the reflected back second collimated light beam from the one or more active pixels with the second polarization therethrough, and to reflect the reflected back second collimated light beam from the one or more inactive pixels with the first polarization, and
- wherein the display member is configured to receive the transmitted second collimated light beam through the second optical member, to generate an image thereat.

The present disclosure provides an optical arrangement for expanding and uniformizing a beam of light. The term "optical arrangement" as used herein relates to an architecture formed from a combination of at least one of optical, electrical and mechanical devices (or instruments) configured for expanding and uniformizing the beam of light. Notably, the optical arrangement is characterized by a reduced footprint and thus occupies lesser space in at least one dimension therein in order to reduce its footprint, for example, for implementation in a head-mounted display or a heads-up display usually placed on a dash of an automobile.

The optical arrangement comprises a first optical member arranged to receive a collimated incoming light beam, from an incoming beam direction, with a first polarization, the first optical member configured to expand and uniformize the collimated incoming light beam along a first axis to form a first collimated light beam exiting therefrom in a first beam direction. The first polarization as used herein relates a to linear polarization and optionally, the first polarization may be one of a circular or elliptical polarization. The term "optical member" as used herein relates to a beam uniformizer and expander i.e., an optical device configured to receive the collimated incoming light beam with the first polarization (such as, from any light source) and thereby expand and uniformize the received collimated incoming light beam to form (or provide) the first collimated light beam exiting from the first beam direction along the first axis. The optical member may be configured to receive the incoming collimated light beam light having a specified optical configuration including, but not limited to, a numerical aperture, an intensity profile, an arbitrary cross-sectional area and the like to thereby emit the collimated light beam having similar (or same) numerical aperture, specified cross-sectional distribution, and a substantially uniform intensity profile across the area to be illuminated (such as, another optical member(s)). Beneficially, the incoming light beam is expanded (or magnified) and uniformized to provide a uniform illumination having identical optical configuration having substantially similar brightness, regardless the location of area to be illuminated by the optical arrangement and at the same time simplifying the image processing task while increasing the contrast and resolution thereat.

The optical arrangement further comprises a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction. Upon expanding and uniformizing the incoming collimated light beam via the first optical member, the emitted first collimated light beam from the first beam direction with the first polarization in relation thereto is received by the second optical member to thereby expand and uniformize the first collimated light beam along the second axis to form the second collimated light beam. Herein, the first optical member and the second optical member may be aligned with respect to each other such that the optical arrangement suitably magnifies the first collimated light beam and at the same time reduces the size and complexity of the optical arrangement. The second optical member expands and uniformizes the intensity of the incident beam in the second direction and thus covering the whole 2D area of a spatial light modulator with substantially uniform illumination. In an example, the first and second optical member are aligned at an angle of 45 degrees with respect to each other. In another example, the first and second optical member are aligned at angle of 60 degrees with respect to each other. It will be appreciated that other optical members (similar or different from the first and second optical members) may be employed by the optical arrangement to suitably magnify the second collimated light beam exiting from the second beam direction thereon without limiting the scope of the present disclosure. Moreover, it must be emphasized that due to the highly collimated nature of the collimated light beam, the image forming beam is also highly collimated allowing to project images onto optical diffuser elements without engaging any additional projection lens or elements having refractory power. Beneficially, a focus-free image is formed having a virtually identical image magnification as the light propagates away such as, from a spatial light modulator (such as, liquid crystal on silicon (LCOS) modulator) In such cases, the second optical member is configured to pass through light with the second polarization substantially without losses, whereas the light with the first polarization is reflected back at a 90-degree angle and cannot be transmitted out in a normal direction to the active surface of a spatial light modulator. Furthermore, the thickness of the second optical member typically is only a few millimeters. For example, 2, 3, 4, 4.5, 5, 6 millimeters (mm) i.e., a much thinner footprint in comparison to conventional coupling beam-splitter. For example, if an LCOS modulator has a square aspect ratio of 21×21 mm, the height of a polarizing beam splitter cube will be at least also 21 mm. In contrast, the second optical member in this case would achieve the same functionality only at a fraction of thickness, for example, at about 5.5 mm thickness. Notably, the thickness of the second optical member depends on the size (footprint) of the spatial light modulator. Generally, the trend is of thicker sizes i.e., second optical member with larger surface area of the spatial light modulator.

In one or more embodiments, the incoming beam direction, the first beam direction and the second beam direction are orthogonal to each other. That is, the incoming beam direction i.e., the direction of the collimated incoming light beam, the first beam direction i.e., the direction of the first collimated light beam and the second beam direction i.e., the direction of the second direction are orthogonal with respect to each other. Beneficially, such an orthogonal configuration provides a simpler and effective configuration that potentially reduces the size occupied by the optical arrangement.

In one or more embodiments, the optical arrangement further comprises a half-wave plate arranged between the first optical member and the second optical member, the half-wave plate configured to shift polarization direction of the first collimated light beam from the first polarization to an altered first polarization, wherein the second optical member is arranged with respect to the first optical member and the half-wave plate such that the first collimated light beam, from the half-wave plate, is received thereat with the first polarization in relation thereto. The term "wave plate" as used herein relates to an optical device configured to alter a polarization state of a light beam travelling through it. Typically, the half-wave plate shifts the polarization direction of linearly polarized first collimated light beam having the first polarization to the altered first polarization before being received by the second optical member. The waveplate (or waver retarder) is configured to split any incoming linearly polarized light beam into its polarization components (such as, an orthogonal component).Herein, the waveplates are constructed from a birefringent material (such as, quartz or mica, polymers, or plastics, and the like), wherein the index of refraction may be different for the first collimated light beam. Typically, within the wave retarder (i.e., made from the birefringent material), the polarization components travel at a different speeds and thus, the output beam has a different polarization state at the exit. Moreover, the thickness of the half waveplate, the wavelength of collimated light beam, and the variation of the index of refraction are selected prior to operation to provide an optimized optical arrangement to beneficially provide a controlled phase shift between the two polarization components of the incoming light wave, thereby altering its polarization to be received by the second optical member thereafter.

In an exemplary implementational scenario of the optical arrangement, the incoming collimated light beam having an S polarization is received by the first optical member and encounters a semi reflective interface between the first type of layer and a second type of layer of the first optical member, wherein the angle of incidence for the light beam in respect to the semi-reflective interface is 45-degrees. Herein, the first optical member is semi reflective for the S-polarized light, a portion of it continues further beyond the interface, another portion is reflected at a 90-degree angle in respect to the incoming collimated light beam. Beneficially, such an arrangement enables both the portions of the incoming collimated light beam to maintain their S-polarization state. Further, the reflected portion of the incoming collimated light beam i.e., the first collimated light beam is directed towards the second optical member to encounter a similar semi reflective interface between the first type of layer and the second type of layer of the second optical member. Beneficially, due to mutual positioning of interfaces of the first and second optical members, the reflected first collimated light beam would have a P polarization state with respect to the second optical member. Such a configuration may lead to manufacturing and operation problems and thus the optical arrangement i.e., the first and the second optical members are preferably made from similar materials to alleviate manufacturing thereof. Thus, to achieve the same effect for the second optical member on the second collimated light beam as observed by the first optical member, the optical arrangement is required to shift or rotate the polarization state of the reflected first collimated light beam by 90 degrees. Thus, after reflection, the first collimated light beam travels via the half waveplate, configured to rotate the polarization state from the S-polarization for the first collimated light beam to P-polarization. As a result, in respect to the second optical member, the polarization of the first collimated light beam corresponds to S-polarization and thus fulfilling the same conditions the incoming collimated light beam encountered when received via the first optical member. Further, the first collimated light beam having the first polarization of S' in respect to the second optical member is received and thereby a portion thereof continues on the straight path while another portion is reflected at a 90-degree angle towards a desired location or optical device such as, towards a "bright" pixel of an LCOS modulator. Beneficially, the polarization state of the portions of the first collimated light beam are maintained as S', wherein the "bright" pixel of the LCOS modulator is configured to rotate the polarization state of the second collimated light beam from the "bright" pixel having an orthogonal polarization P'. Thus, when the second collimated light beam is reflected from the "bright" pixel of a spatial light modulator and once again encounters the second optical member, the second collimated light beam is transmitted towards it substantially without losses. Further, the light beam exiting the second optical member may be directed towards a stack of optical diffuser elements.

In one or more embodiments, the first optical member comprises a first stack of layers with a plurality of layers of a first type and a plurality of layers of a second type, wherein every second layer is of the first type and every other second layer is of the second type in the first stack of layers. Typically, the first stack of layers of the first optical arrangement comprises alternatively arranged first and second type of layers. Moreover, the second optical member comprises a second stack of layers with a plurality of layers of a third type and plurality of layers of a fourth type, wherein every second layer is of the third type and every other second layer is of the fourth type in the second stack of layers. Similar to the first stack of layers, the second stack of layers are also alternatively arranged to effectively expand and uniformize the respective collimated light beam. Typically, the material, thickness, coefficient of refraction of the optical member is varied suitably to efficiently and effectively expand and uniformize the collimated light beam. Herein, the first type of layers and the third type of layers of the first and second optical member are made of glass slabs and wherein the second type of layers and the fourth type of layers are made of a thin bonding polymer, respectively. Herein, preferably, the first type of layers or the third type of layers have a refractive index of about 1.65 and the second type of layers or the fourth type of layers that are thin bonding layers of an optical polymer (such as, optical glue, optical adhesive or cement) having substantially similar refractive indices. In an example, the indices of refraction for the second type of layers can be, for example, 1.42, 1.37, 1.315, while the first type of layers have the index of refraction of 1.65. In an exemplary scenario, slabs of the first type of layers and thus corresponding interfaces between the first type of layers and the second type of layers form a 45-degree angle with respect to the received collimated light beam.

In one or more embodiments, the normal vector of the interface formed by the layers of the first type and the second type of the first optical member and the normal vector of the interface formed by the third type of layers and the fourth type of layers of the second optical member, form an angle of 60 degrees. The first optical member and the second optical member have input facet and a corresponding output facet. Furthermore, input facet is orthogonal to the output facet of the first optical member as well as for the second optical member. However, the input facet of the second optical member is parallel to the output facet of the first optical member. Herein, the interface between third type of layers and the fourth type of layers of the second optical member forms substantially 45 degree angle with the output facet of the first optical member, and similarly the interfaces between the first type of layers and the second type of layers of the first optical member form a substantially 45 degree angle with the input facet of the second optical member.

In one or more embodiments, a normal vector to the layers of the third type and/or the fourth type in the second optical member and a normal vector to the layers of the first type and/or the second type in the first optical member form an angle of substantially 60 degrees therebetween. The first optical member and the second optical member have input facet and a corresponding output facet, wherein the input facet is orthogonal to the output facet of the first optical member as well as for the second optical member. However, the input facet of the second optical member is parallel to the output facet of the first optical member. Herein, the interface between third type of layers and the fourth type of layers of the second optical member forms an angle of 60 degrees substantially with the output facet of the first optical member, and similarly the interfaces between the first type of layers and the second type of layers of the first optical member form a substantially 60 degree angle with the input facet of the second optical member.

In one or more embodiments, the layers of the first type in the first stack of layers have a higher index of refraction as compared to the layers of the second type in the first stack of layers and the layers of the third type in the second stack of layers have a higher index of refraction as compared to the layers of the fourth type in the second stack of layers to provide a controlled reflection or transmission ratio dependent upon the state of polarization of the incident light beam. In one or more embodiments, the first stack of layers has a first region (R1) and a second region (R2) defined therein, with the first region being closer to face of the first optical member receiving the collimated incoming light beam and the second region being farther to the said face of the first optical member receiving the collimated incoming light beam as compared to the first region, and wherein the layers of the second type in the first region have a first index of refraction and the layers of the second type in the second region have a second index of refraction, and wherein the first index of refraction is higher than the second index of refraction and the second stack of layers has a third region and a fourth region defined therein, with the third region being closer to face of the second optical member receiving the first collimated light beam and the fourth region being farther to the said face of the second optical member receiving the first collimated light beam as compared to the third region, and wherein the layers of the fourth type in the third region have a third index of refraction and the layers of the fourth type in the fourth region have a fourth index of refraction, and wherein the third index of refraction is higher than the fourth index of refraction. Typically, the optical members comprise more than one region such as, the first, second, third or fourth region, wherein the index of refraction for the second type of layers may change in gradients (i.e., in groups). In an example, the second type of layers belonging to the region R1 have the first index of refraction $n1$, the second type of layers belonging to the region R2 have the second index of refraction $n2$, the second type of layers belonging to the region R3 have the third index of refraction $n3$. Furthermore, as regions R1 through R3 change from the direction of incoming collimated light beam, the indices of refraction follow a pattern $n1>n2>n3$, where $n1$ is lower than the index of refraction of the first type of layer. In effect, it means that for the first interfaces the incoming collimated light beam encounters the difference between the indices of refraction for the first type of layers and the second type of layers is smaller, meaning that the coefficient of reflection is lower. As the light propagates further into the second beam expander and uniformizer, the coefficient of reflection increases, due to a larger difference in the indices of reflection for the first type of layers and the second type of layers. Notably, the number of regions for the variation of the index of refraction for the second type of layers can vary (not limited to 3 as per example) and it can be 2, 3, 4, 5 . . . up to each of the interfaces between the two adjacent first type of layers having unique index of refractions. Beneficially, to obtain efficient and accurate results, the optical arrangement may comprise 3 to 5 regions for considerably large spatial light modulators i.e., 0.7"-1" diagonally in size. Moreover, for smaller footprints of the optical arrangement, the physical size of the first and second optical members is kept smaller to potentially reduce the number of regions to achieve acceptable intensity uniformization across the whole surface of a spatial light modulator. Optionally, there may be a single region i.e., all of the second type of layers are identical. Nevertheless, considering typical use-case, size of utilized spatial light modulators typically is substantially larger than can be covered by single index of refraction for the second type of layers. Notably, compositionally the first and second optical members of the optical arrangement of the present disclosure are identical to the above described first and second optical members. The exception is in omitted description of a compensation prism required for the second optical member.

In one or more embodiments, the second optical member further comprises an interface layer in a region farthest to face of the second optical member receiving the first collimated light beam, with the interface layer configured to reflect substantially the entire first collimated light beam with the first polarization received thereat and is transparent to light beam with a second polarization. Herein, the interface layer is configured to reflect substantially all intensities of the first collimated light beam having the first polarization that reaches the interface layer and is transparent (or passive) to the portion of the light beam having the second polarization. Herein, the interface layer is a fifth type of layer different from the fourth type of layers. The fifth type of layer comprises a polarization beam-splitting coating deposited thereon (such as, on an optical prism or a compensation prism) and a thin optical adhesive layer for bonding the functional coating of polarization sensitive beam splitter and the compensation prism to the adjacent third type of layer. Notably, the refractive index of the optical adhesive comprising the third type of layer is substantially similar to that of the fifth type of layer. Furthermore, the material of the compensation prism is identical to that of the third type of layers.

In one or more embodiments, a ratio of thickness of each of the layers of the first type to each of the layers of the second type in the first optical member is in a range of 50:1 to 200:1 and a ratio of thickness of each of the layers of the third type to each of the layers of the fourth type in the second optical member is in a range of 50:1 to 200:1. Herein, each of the thickness ratio between the first type of layers and the second type of layers in the first optical member and the thickness ratio of thickness of each of the layers of the third type to each of the layers of the fourth type in the second optical member is in a range of 50:1 to 200:1. In an example, the thickness ratio between the first type of layers and the second type of layers varies between 50:1, 75:1, 100:1, 125:1, 150:1, 175:1 up to 75:1, 100:1, 125:1, 150:1, 175:1, 200:1. In a preferred example, the said thickness ratios are around 100:1; i.e., the first type of layers are 100 times thicker than the second type of layers, and the third type of layers are 100 times thicker than the fourth type of layers. In an example, in one of the embodiments, the thickness of first type of layers is 400 micrometers, whereas the thickness of the second type of layers is 4 micrometers, and the thickness of third type of layers is 400 micrometers, whereas the thickness of the fourth type of layers is 4 micrometers.

In one or more embodiments, an Abbe number of each of the layers of the first type and an Abbe number of each of the layers of the second type in the first optical member are substantially same and an Abbe number of each of the layers of the third type and an Abbe number of each of the layers of the fourth type in the second optical member are substantially same. It may be understood that to mitigate any intensity inconsistencies across the spectrum of incoming collimated light beam, it is preferable to match the Abbe number of the first type of layers and the second type of layers. Herein, "substantially same" may be considered to be in broader sense, and may indicate that the Abbe number of each of the layers of the first type and the Abbe number of each of the layers of the second type in the first optical member may be close to each other, i.e., in a same positive or negative side and within 20-40% of each other. In changing the index of refraction of the second type of layers or fourth type of layers across regions of the first optical member or the second optical member respectively, the Brewster's angle of corresponding interfaces between the first type of layers and the second type of layers or the third type of layers and the fourth type of layers will slightly deviate from ideally preferable value of 45-degrees. For example, covering a range from around 39 degrees to 52 degrees. Beneficially, the range is close to 45 degrees, wherein the reflectivity of P-polarization around the 45-degree incidence is negligible and thus doesn't interfere with the intended operation of the optical arrangement and enables query free operation.

In one or more embodiments, the layers of the first type in the first optical member are substantially same as the layers of the third type in the second optical member, and the layers of the second type in the first optical member are substantially same as the layers of the fourth type in the second optical member. That is, the layers of the first type in the first optical member may be made of same material(s) as the layers of the third type in the second optical member, and the layers of the second type in the first optical member may be made of same material(s) as the layers of the fourth type in the second optical member.

In another aspect, the present disclosure relates to a projector unit having an architecture of a projection device having various possible areas of deployment such as, in vehicle head-up display systems or near-to-eye displays. The projector unit is characterized by a reduced footprint and thus occupies lesser space in at least one dimension therein, for example, a dash of an automobile. In other aspects, the present disclosure is characterized by an image having a 3D depth quality through accommodative depth cues. Throughout the present disclosure, the term "projector unit" as used herein relates to specialized equipment for projecting the plurality of image planes associated with the three-dimensional image upon display members. Examples of the projector include, but are not limited to, a setup with Digital Micro Mirror Devices (DMD technology by Texas Instruments®), a Liquid Crystal Display (LCD), a Liquid Crystal on Silicon (LCoS) or other type of spatial light modulator combined with a light source such as a Light Emitting Diode (LED) light source, high intensity discharge (HID) light source with colored filters, color lasers or other type of bright light sources possible to be highly collimated.

The projector unit comprises a light source configured to provide a collimated incoming light beam with a first polarization. The projector unit comprises the light source configured to provide the collimated incoming light beam with the first polarization, wherein the light source is adapted to be arranged to emit the light beam towards an optical arrangement. The projector unit comprises the light source for emitting the light beam collimated incoming light beam therefrom. Throughout the present disclosure, the term "light source" used herein relates to equipment that is used to emit the incoming collimated light beam therefrom. It will be appreciated that in operation, the light source is configured to emit the light beam of visible wavelength (namely, light of a wavelength that is visible to humans). Examples of the light source include, but are not limited to, at least one visible light-emitting diode, at least one visible light laser, a high intensity gas-discharge type bulb light source. Optionally, the light source is implemented by way of a plurality of light emitting diodes configured to emit light of at least three wavelengths, wherein at least one first light emitting diode is configured to emit light having a first wavelength, at least one second light emitting diode is configured to emit light having a second wavelength and at least one third light emitting diode is configured to emit light having a third wavelength.

Optionally, the second wavelength is greater than the first wavelength, but lesser than the third wavelength. As an example, the first wavelength may correspond to a blue color light (namely, a wavelength lying between 440 nanometers to 470 nanometers), the second wavelength may correspond to a green color light (namely, a wavelength lying between 520 nanometers to 550 nanometers), and the third wavelength may correspond to a red color light (namely, a wavelength lying between 610 nanometers to 650 nanometers). Alternatively, or optionally, the second wavelength is greater than the third wavelength, but lesser than the first wavelength. As an example, the first wavelength may correspond to a red color light (namely, a wavelength lying between 610 nanometers to 650 nanometers), the second wavelength may correspond to a green color light (namely, a wavelength lying between 520 nanometers to 550 nanometers), and the third wavelength may correspond to a blue color light (namely, a wavelength lying between 440 nanometers to 470 nanometers).

Optionally, the light source is a true-color light source. In such a case, the wavelength(s) of light emitted by the light source allow for rendition of true-color within the displayed three-dimensional or multi-focal image. More optionally, a driver module is configured to control an intensity of the light beam that is emitted from the light source. As an example, the light source may comprise a red color light emitting diode, a green color light emitting diode, and a blue color light emitting diode, wherein intensities of light emitted by the aforesaid light emitting diodes may be adjusted to provide true-color within the displayed three-dimensional image.

The projector unit further comprises an optical arrangement, wherein the optical arrangement comprises a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction. The optical arrangement further comprises a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction.

The projector unit further comprises a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization, wherein the second optical member is configured to transmit the reflected back second collimated light beam from the one or more active pixels with the second polarization therethrough, and to reflect the reflected back second collimated light beam from the one or more inactive pixels with the first polarization in a direction opposite to the first beam direction, However, the second collimated light beam with the first polarization is reflected back at least partially at a 90-degree angle and unable to be directly transmitted out in a direction normal to an active surface of the spatial light modulator. In such a scenario, due to multiple reflections of the second collimated light beam with the first polarization, escaping the second optical member in the direction normal to the active surface of the spatial light modulator, forms a uniformized and substantially attenuated light beam in respect to a light intensity, background illumination, which may be further filtered off by a polarization filter configured for selectively transmitting the collimated light beam with the second polarization while blocking the first polarization.

As may be understood, a typical LCOS modulator has to be illuminated externally and for this purpose the conventional or prior-art approach is utilization of polarizing beam splitter or polarizing beam-splitter cube with a polarizing inner surface angled at a 45-degree angle in respect to the surface of the LCOS modulator. An external beam of light is directed towards the input surface of the polarizing beam-splitter cube, wherein the incident beam of light prior entering the polarizing beam-splitter cube, optionally passes through a linear polarizer, which preconditions the beam of light to become linearly polarized. This optional step can improve overall image contrast, as preforms preliminary filtering of one of the polarization components.

LCOS technology can vary based on the configuration of the liquid crystal medium. For example, the amplitude modulation can be executed in a binary form using, for example, pulse-width modulation. In such case the liquid crystal switches between two states which is a characteristic of ferroelectric liquid crystals. Alternatively, the reflected intensity can be modulated in an analogue way with some discretization, wherein such type of control is typically observed in twisted nematic type liquid crystal configurations of the active medium. The reflected predominantly or ideally linearly polarized illumination light beam exiting from the polarizing beam-splitter cube illuminates the LCOS modulator directly or through a compensation plate. Typically, the compensation plate is a wave retarder employed to compensate the phase shift a light traveling through the liquid crystal medium gains and is typically employed for some twisted nematic liquid crystal configurations. In one of the cases, no other wave retardation means are used, as the liquid crystal itself acts as a switchable quarter waveplate. For example, such configuration can be found in ferroelectric LCOS devices (such as by 4th dimension displays). Thus, locally on a pixel level, the liquid crystal can retard the incident light by a different amount upon applied voltage. If the pixel is "on", the liquid crystal becomes a quarter waveplate and an S-polarized light going through the liquid crystal layer becomes circularly polarized, and after reflecting from the embedded mirror surface changes the direction of circular polarization. An oppositely circularly polarized light going through the liquid crystal medium back is transformed back to linearly polarized light with orthogonal polarization in respect to the incident light i.e., if an S-polarized light was incident upon a spatial light modulator, at the site of "pixel-on", the reflected light will be substantially P-polarized. Thus, "on-pixel" light can travel through polarizing beam splitter surface and leave the beam-splitter cube towards the observer.

Throughout the present disclosure, the term "spatial light modulator" used herein relates to specialized equipment configured to modulate the incoming collimated light beam. In other words, the spatial light modulator is configured to modulate an amplitude and/or phase of the emitted light beam in at least one dimension. Optionally, the spatial light modulator is implemented by way of at least one of: a digital micromirror device (DMD), a liquid crystal based spatial light modulator, a liquid crystal on silicon (LCoS) type spatial light modulator. It will be appreciated that the present disclosure does not work directly with the DMD spatial modulators and may required additional optical elements for further utilization thereat.

Alternatively, if liquid crystal on silicon (LCoS) type spatial light modulator is utilized, the spatial light modulator is associated with a polarization-sensitive beam splitter or otherwise a polarization cube, which is used to direct the polarized unmodulated light from the light source towards the active area of the spatial light modulator and to extract the modulated light beam and direct it towards the optical arrangement or the projector unit.

In operation the second optical member first directs predominantly linearly polarized light (the second collimated light beam) towards an LCOS-type spatial light modulator, which based on the pixel configuration (image) reflects back modulated in segments (pixels) light, which is either with the same polarization as the incident illumination beam or has orthogonal polarization. In some instances (depending on the utilized LCOS modulator), light reflected from the LCOS modulator can provide a mixture of polarizations i.e., it can contain both orthogonal polarization components in varying intensity proportions. Furthermore, the second optical member is configured to substantially loss-less pass through the incident beam having orthogonally polarized light. For example, if one considers the incident (illumination beam) produced by the second optical member to have the first polarization, the LCOS modulator has, based on individual configuration of each pixel, an option to output via reflection either "on" pixels having a second polarization which is substantially orthogonal to the first polarization, or "off" pixels having the first polarization i.e., a binary modulation is performed by an LCOS modulator. Alternatively, the second optical member receives the ideally or predominantly S-polarized incident light beam which upon entry encounters internal interfaces between the third type of layers and the fourth type of layers. The material for the fourth type of layers is chosen in regard to the material of the third type of layers to ensure polarization sensitivity and beam-splitting capability. That is, the material combination is chosen so that the Brewster's angle is close to 45-degree incidence. Herein, at this angle, the S-polarization is reflected to some extent, while P-polarization is fully transmitted. Furthermore, by finetuning the material choice for the second type of layers, the reflectance of S-polarization can be controlled i.e., a part of S-polarized light is reflected towards the output facet of the second optical member, while the remaining part of intensity propagates further to encounter following interfaces between the third type of layers and the fourth type of layers. Upon each encounter of the interface a part of S-polarizer light is directed towards the output facet of the second optical member to illuminate the spatial light modulator, wherein to ensure high quality of uniformization, a gradient nature of reflectance for the S-polarized light is achieved.

In one or more embodiments, the optical arrangement is the optical arrangement according to the optical arrangement for expanding and uniformizing the beam of light of the present disclosure.

In one or more embodiments, the optical arrangement further comprises a polarization filter arranged next to the second optical member and the spatial light modulator in respect to the reflected back second collimated light beam from the one or more inactive pixels with the first polarization, the polarization filter configured to filter the reflected back second collimated light beam from the one or more inactive or "off" pixels with the first polarization. Typically, the arrangement of the polarization filter is done next to the second optical member and the spatial light modulator, wherein the first output facet of the second optical member faces the spatial light modulator and wherein the second output facet of the second optical member faces another optical element (such as, a display member). As the beam-splitter interfaces of the second optical member can transmit a bit of the unwanted orthogonal (first) polarization towards the spatial light modulator, filtering using a high-quality linear polarizer, ensures that the reflected incident light beam has a minimum amount of orthogonally polarized light intensity. Typically, to filter stray illumination from "dark" pixels a polarization sensitive filter i.e., for example, a filter predominantly transmitting only the polarization corresponding to "bright" pixels, while absorbing or reflecting back orthogonal polarization (corresponding to "dark" or "off" pixels). Optionally, when the spatial light modulator is implemented by way of the liquid-crystal based spatial light modulator, the projector further comprises at least one polarizer configured to provide polarized light to the spatial light modulator. In such a case, the at least one polarizer is configured to polarize the light beam emitted from the light source, prior to its incidence upon the spatial light modulator.

In yet another aspect, the present disclosure provides a display apparatus. The display apparatus comprising a light source configured to provide a collimated incoming light beam with a first polarization. The display apparatus further comprises an optical arrangement comprising a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction and a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction. The display apparatus further comprises a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization.

The display apparatus further comprises a display member arranged in the direction opposite to the second beam direction with respect to the spatial light modulator, wherein the second optical member is configured to transmit the reflected back second collimated light beam from the one or more active pixels with the second polarization therethrough, and to reflect the reflected back second collimated light beam from the one or more inactive pixels with the first polarization in a direction opposite to the first beam direction, and wherein the display member is configured to receive the transmitted second collimated light beam through the second optical member, to generate an image thereat. Herein, the second collimated light beam with the first polarization is reflected back at least partially at a 90-degree angle and is unable to be directly transmitted out in a direction normal to an active surface of the spatial light modulator. In such a scenario, due to multiple reflections of the second collimated light beam with the first polarization, escaping the second optical member in the direction normal to the active surface of the spatial light modulator, forms a uniformized and substantially attenuated light beam in respect to a light intensity, background illumination, which may be further filtered off by a polarization filter configured for selectively transmitting the collimated light beam with the second polarization while blocking the first polarization to further form the image thereat.

Optionally, the display apparatus comprises a graphics processing unit configured to process the three-dimensional image to generate the plurality of image planes corresponding thereto. In other words, the graphics processing unit is configured to decompose the three-dimensional image into its corresponding plurality of image planes. Throughout the present disclosure, the term "graphics processing unit" relates to specialized hardware, software, firmware, or a combination of these, that is configured to process the three-dimensional image to generate the plurality of image planes corresponding thereto. It will be appreciated that the graphics processing unit typically contains a large number (for example, several thousand) of processing cores allowing for parallel processing of three-dimensional image data, thus boosting the processing performance. Therefore, the graphics processing unit can optionally be configured to parallelly process the multiple three-dimensional images at a substantially-high computation rate to generate a plurality of image planes corresponding to each image of the multiple three-dimensional images. Beneficially, embodiments of the present disclosure enable to implement the display apparatus in a more compact size and manner. Furthermore, the display apparatus is able to provide substantially-constant image magnification associated with the individual physical image depth planes of the three-dimensional image projected thereupon. Therefore, a viewer of the display apparatus is able to perceive actual size of entities/attributes depicted in the displayed three-dimensional image. Furthermore, the aforementioned method requires lesser computational efforts for displaying the three-dimensional image as compared to conventional display systems.

Throughout the present disclosure, the term "display apparatus" as used herein relates to a specialized equipment configured to display the multi-focal image (or three-dimensional image) to a viewer in a manner such that the three-dimensional image appears to have actual physical depth. Alternatively stated, the display apparatus is operable to act as a device for displaying the multi-focal image in a real three-dimensional volume. It will be appreciated that the multi-focal image relates to a three-dimensional image of at least one three-dimensional object (for example, such as a person, statue, furniture, and the like), a three-dimensional scene (for example, such as a beach scene, a mountainous environment, and the like), and so forth.

Furthermore, the term "display member" as used herein relates to an optical component configured to enable display of at least a part of the multi-focal image thereupon. In other words, a given display member is configured to receive projection of a given image plane thereupon. It will be appreciated that the plurality of display members are configured to receive thereupon, the projection of the plurality of image planes, to display the multi-focal image at the display apparatus. Furthermore, a physical arrangement of the plurality of display members constitutes the real three-dimensional volume of the multi-plane display apparatus whereat the multi-focal image is displayed or formed. Optionally, a number of the plurality of display members within the display apparatus lies within a range of 2 to 50. As an example, the display apparatus may comprise 2, 3, 4, 5, 10, 15, 20, 25, 30, 35, 40, 45 or 50 display members. Alternatively, or optionally, the number of the plurality of display members within the display apparatus is greater than 50. As an example, the display apparatus may comprise 55, 60, 65, 70, 75, 80, 85, 90, 95 or 100 display members. Optionally, the plurality of display members are arranged to have equal spacing therebetween. Alternatively, or optionally, the plurality of display members are arranged to have unequal spacing therebetween. In an example, the plurality of display members are arranged as a 4 millimeter thick stack. In such cases, the display members may be arranged to have an equal at least 0.7 mm spacing therebetween.

Optionally, the plurality of display members are substantially-flat in shape. Alternatively, or optionally, the plurality of display members are substantially-curved in shape.

Optionally the projection volume (i.e., the volume of display apparatus) may be implemented with a sweeping (reciprocating) single display member. The sweeping single display member may be a passive diffuser element. The passive diffuser element can be for example a light diffusing membrane, film, or a sheet. In said embodiment the display members move rapidly from one (depth) distance to other as the respective image planes representing the depth distance are projected onto the display member. Further optionally, a multiplane volumetric display volume may be implemented with a combination of moving or sweeping display member and stationary display member (i.e., with electrically controllable diffuser elements).

In one or more embodiments, the display member comprises a stack of switchable optical diffuser elements, to generate the image with multiple depth planes. Optionally, the plurality of display members are implemented by way of a plurality of optical diffusers which are electrically controllable. Throughout the present disclosure, the term "optical diffuser" used herein relates to an optical component configured to display a given image plane projected thereupon. The plurality of optical diffusers are electrically controllable in order to select which of the diffuser is used for projecting image plane (in diffused state), wherein the optical diffusers are optically transparent. Therefore, the plurality of optical diffusers are configured to display the plurality of image planes projected thereupon, to thereby display the multi-focal image. Optionally, the plurality of optical diffusers are implemented by way of cholesteric-type liquid crystal diffusers. In such a case, the plurality of optical diffusers are electrically switchable (controllable) to toggle between an optically transparent state and an optically diffusive state. Notably, a given optical diffuser displays a given image plane projected thereupon, only while the given optical diffuser is in the optically diffusive state. Therefore, in operation, the plurality of optical diffusers are rapidly and sequentially switched to the optically diffusive state, to display plurality of image planes, thereby, producing the actual physical depth associated with the three-dimensional image. Therefore, at a given point of time, only one optical diffuser may be in the optically diffusive state while the remaining optical diffusers are in the optically transparent state. Example of the plurality of optical diffusers include, but are not limited to, Liquid Crystal (LC) optical diffusers. Generally, the optical diffuser that may be controlled with electric signals are referred to as an electrically controllable optical diffuser.

In one or more embodiments, the display apparatus comprises a magnifying eyepiece, wherein the magnifying eyepiece is at least one of an optical lens (for example for virtual reality application), a bird bath image combiner, a freeform magnifying image combiner or a combination of at least one of the optical lens and a flat beam splitter optical image combiner to provide a magnified view of the generated image to a user. Flat beam splitter can be in practical terms one lens and a flat piece of glass at a 45 degree angle. Lens performs magnification, while flat beam splitter ensures optical image combination. Typically, the display apparatus using the bird-bath optical image combiner is configured to provide a magnified view of the generated image to a user. The bird-bath optical image combiner is configured to provide the magnified view of the generated image to the user while reducing the cost of operation and at the same time being relatively smaller or more compact while providing a good overall image quality. Typically, the operation of the image formation by the LCOS modulator and the switching of optical diffuser elements within the stack is synchronized to accurately output corresponding image depth planes. In an augmented reality head-mounted display, the image formed on the diffuser elements is magnified by the magnifying eyepiece. In the particular example, the magnifying eyepiece is a part of an optical image combiner which known as a "bird-bath" combiner and is comprised of two beam-splitter components i.e., a flat beam splitter, and a curved beams splitter having optical power, wherein the light from the diffuser elements first hits the flat beam splitter, which redirects a part of it towards the second beam splitter having a specified optical power. Further, a part of the light is reflected backwards and through the first beam splitter may enters an observer's eye, wherein due to magnification by the semi-reflective surface (mirror) having optical power of the second beam splitter, the observer perceives magnified virtual images of the optical diffuser elements being arranged at different distances, thus enabling re-accommodation of the eye between available focal distances.

In one or more embodiments, the display apparatus is a head-mounted near eye display. In one or more embodiments, the display apparatus is a head-up display. The disclosed embodiments of the present disclosure combines switchable optical diffuser elements with an LCOS-type spatial light modulator to derive an optical near-eye-display module, which is more compact and in particular substantially thinner than prior art implementations and enables compact footprint of a near-eye display device, while inherently providing substantially equal image magnification on each of the physical diffuser layers forming a stack. Optionally, the display apparatus is implemented in a head-mounted display apparatus (or a head-up display) or a head mounted near eye display apparatus. In such implementation dimensions of the device and related optics should be scaled accordingly. In such a case, an eye strain and discomfort generally felt by the viewer, that are associated with use of two-dimensional displays in a stereoscopic-type 3D head-mounted display apparatus, are substantially reduced. It will be appreciated that the head-mounted display apparatus could be used for rendering simulated environments to the viewer. Therefore, when the head-mounted display apparatus is used for displaying the three-dimensional image, the viewer's experience of the simulated environment is substantially enhanced. Optionally, the simulated environment is one of: a virtual reality environment, a mixed reality environment, an augmented reality environment.

Optionally, at least the projector, the display driver and the multiplane display member of the display apparatus are implemented within the head-mounted near-eye display apparatus. In such a case, the graphics processing unit could be implemented within the head-mounted display apparatus, or otherwise it might be implemented remotely.

DETAILED DESCRIPTION OF THE DRAWINGS

Referring to FIG. 1, illustrated is a simplified schematic illustration of an optical arrangement 100 for expanding and uniformizing a beam of light, in accordance with an embodiment of the present disclosure. It will be appreciated that the input and output facets of the first and second optical member are omitted and only shows the internal semi-reflective interfaces for simplified illustration of the optical arrangement. As shown, the optical arrangement 100 comprises a first optical member 102 arranged to receive a collimated incoming light beam 106, from an incoming beam direction D1, with a first polarization S, the first optical member 102 configured to expand and uniformize the collimated incoming light beam 106 along a first axis to form a first collimated light beam 108 exiting therefrom in a first beam direction A and a second optical member 104 adapted to receive the first collimated light beam 108, from the first beam direction A, with the first polarization S in relation thereto, the second optical member 104 configured to expand and uniformize the first collimated light beam 108 along a second axis to form a second collimated light beam 110 exiting therefrom in a second beam direction B. Notably, there may be multiple reflections of the collimated incoming light beam 106 within the optical members 102 or 104 prior to exiting in the second beam direction B.

Further, the optical arrangement 100 comprises a half-wave plate 112 arranged between the first optical member 102 and the second optical member 104, the half-wave plate 112 configured to shift polarization direction of the first collimated light beam 108 from the first polarization S to an altered first polarization P, wherein the second optical member 104 is arranged with respect to the first optical member 102 and the half-wave plate 112 such that the first collimated light beam 108, from the half-wave plate 112, is received thereat with the first polarization S in relation thereto. The optical members 102, 104 typically comprises a plurality of different type of layers therein such as, a first type of layer i.e., a glass layer and a second type of layer that is of another type of optical material. Herein, in the exemplary scenario, the incoming collimated light beam 106 having the first polarization S enters the first optical member 102 and encounters a semi reflective first interface 102A between a first type of layer and a second type of layer of the first optical member 102. The angle of incidence for the incoming collimated light beam 106 in respect to the first interface 102A is 45-degrees. Further, as the first interface 102A is semi reflective for the S-polarized light, a portion thereof 106A continues further beyond the first interface 102A, while another portion that forms the first collimated light beam 108 is reflected at a 90-degree angle in respect to the incoming collimated light beam 106, wherein the first collimated light beam 108 maintains their first polarization S state. Further, the first collimated light beam is directed towards the second optical member 104, wherein the first collimated light beam 108 encounters a semi reflective second interface 104A between a third type of layer and a fourth type of layer of the second optical member 104. Herein, due to a mutual positioning of the first and second interfaces 102A and 104A, the reflected portion 108 would have S polarization state in respect to the second interface 104A or the second optical member 104. Moreover, the second light beam 110 exiting therefrom in the second direction may either have a P polarization state (i.e., in case of a bright pixel) or the S polarization state (i.e., in case of a dark pixel).

Furthermore, optionally, to alleviate manufacturing of the first and second optical members 102 and 104, preferably similar materials are used for both optical members. Thus, to achieve same effect for the second interface 104A on the first collimated light beam 108 as was observed by the first interface 102A, it is required to shift or rotate the polarization state of the first collimated light beam 108 by 90 degrees. Thus, after reflection, the first collimated light beam 108 travels through the half waveplate 112, which rotates the polarization state from the first polarization S for the first collimated light beam 108 to a second polarization P for the first collimated light beam 108. Herein, in respect to the second interface 104A, the first polarization of the first collimated light beam 108 corresponds to S-polarization thus fulfilling the same conditions as the collimated incoming light beam 106 encountered when hitting the first interface 102A. Consequently, the first collimated light beam 108 having a first polarization state of S in respect to the second interface 102A is incident thereat, wherein a portion 108A continues on the straight path while another portion 108 (that later forms the second collimated light beam 110) is reflected at a 90-degree angle towards a "bright" pixel of an LCOS modulator 114, wherein beneficially the first polarization state of the portions of the first collimated light beam 108 is maintained as the first polarization S. As, the "bright" pixel of an LCOS modulator is configured to rotate the polarization state of the second collimated light beam 110 by 90 degrees from the "bright" pixel of the LCOS modulator 114 having an orthogonal polarization. Beneficially, when the second collimated light beam 110 once again encounters the second interface 104A, it is transmitted towards it substantially without losses. Thus, the second collimated light beam 110 leaves the second optical member 104 and is directed towards a stack of optical diffuser elements.

Alternatively, or optionally, when forming the first and the second optical members 102 and 104, it is of utmost importance to control the polarization dependent reflection of the interfaces 102A and 104A. In the preferred embodiment of the present disclosure, it is accomplished by varying properties of optical adhesive (or second type of layers) and the glass slabs (or first type of layers). Nevertheless, the same effect can be achieved by utilizing engineered beam splitting surfaces, such as multi-layer thin film coatings. In such cases, the engineered thin film coatings would be directly deposited on the glass substrates (first type of layers), which then would be bonded together with adhesive, having optical properties as close as possible to that of the glass substrate (first type of layer).

Figure 2A:
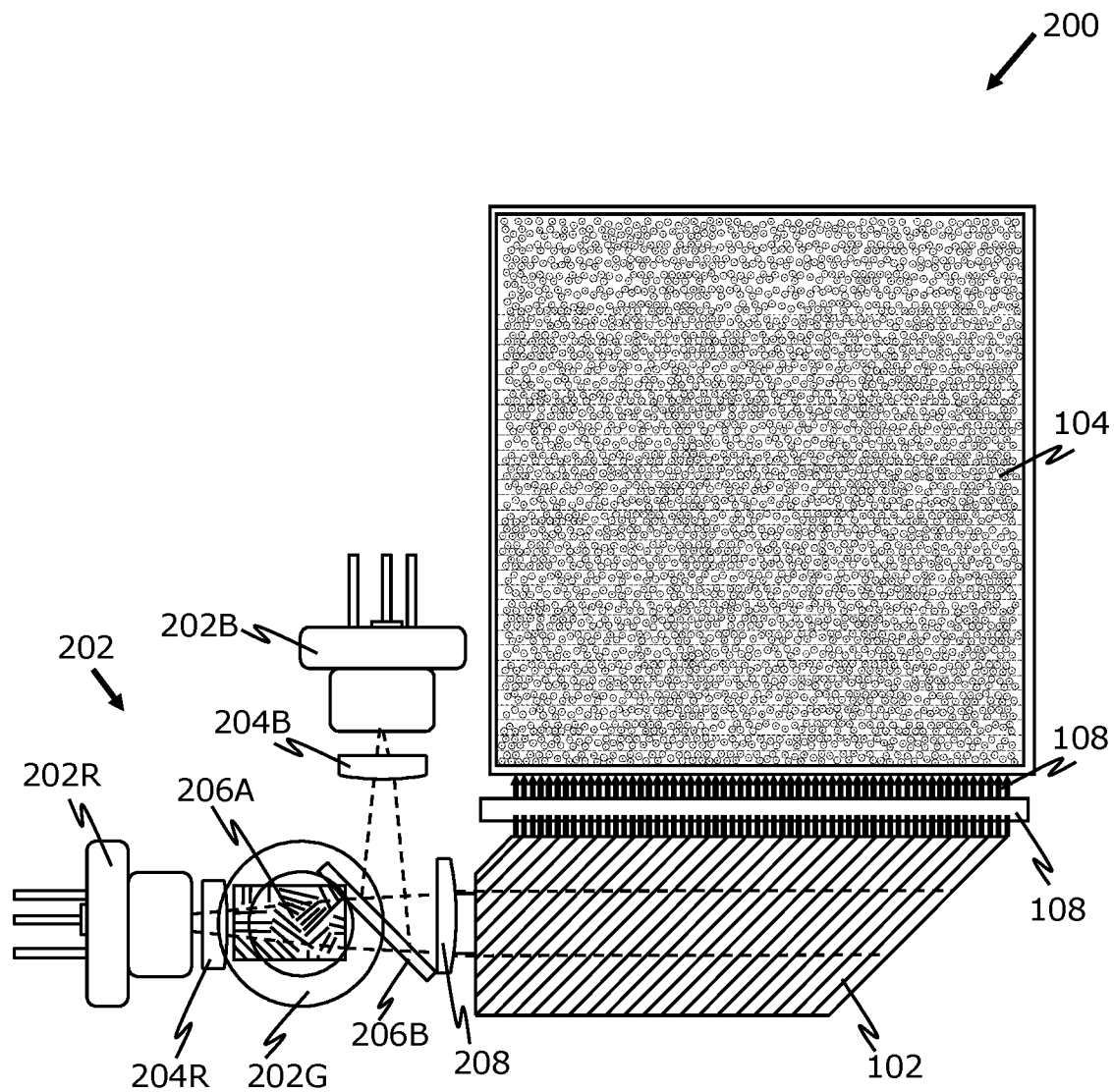
FIG. 2A is a schematic top view of a projector unit implementing the optical arrangement of FIG. 1, in accordance with various embodiments of the present disclosure.
Figure 2B:
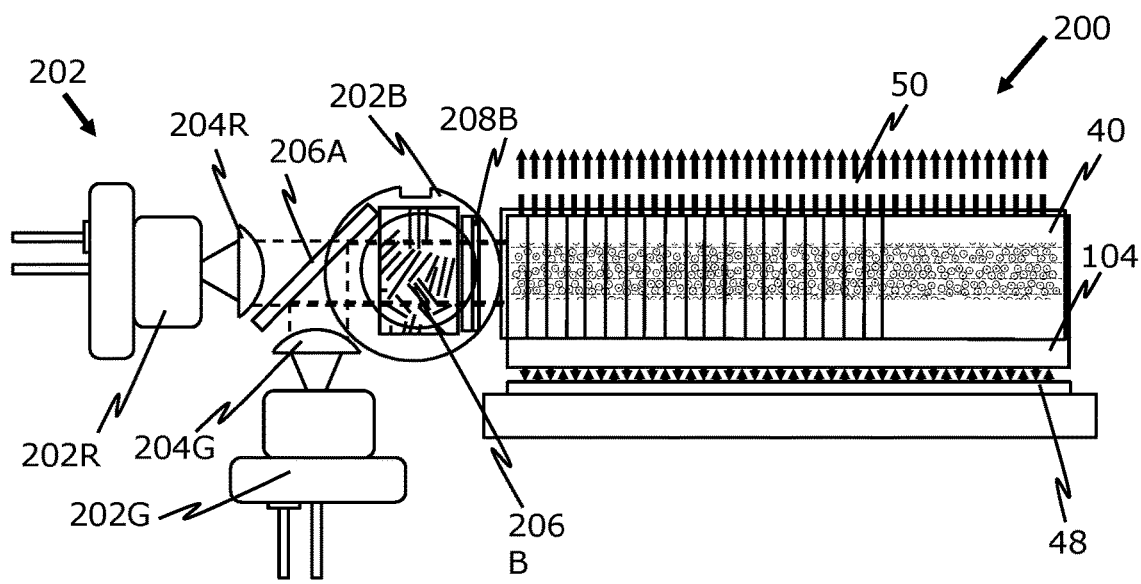
FIG. 2B is a schematic side view of a projector unit implementing the optical arrangement of FIG. 1, in accordance with various embodiments of the present disclosure.
Figure 2C:
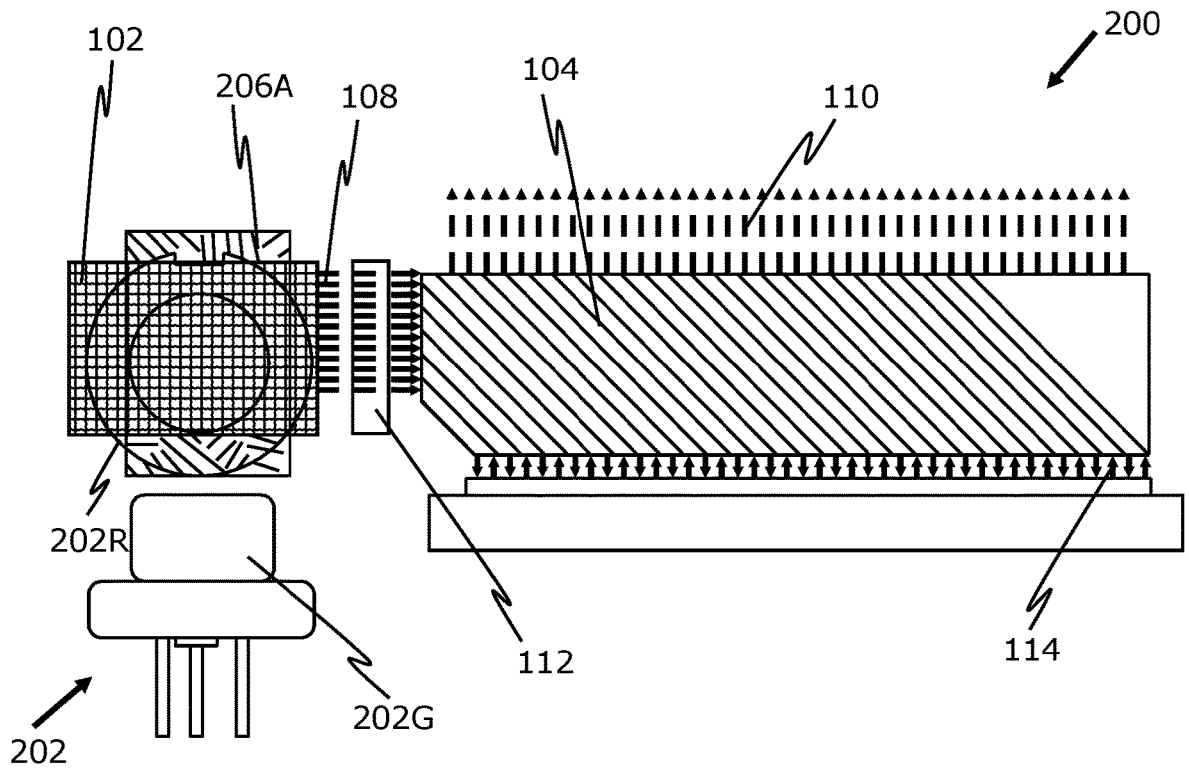
FIG. 2C is a schematic front view of a projector unit implementing the optical arrangement of FIG. 1, in accordance with various embodiments of the present disclosure.

Referring to FIGS. 2A-2C, illustrated are schematic top view, side view and front view of a projector unit 200, in accordance with various embodiments of the present disclosure. Herein, the basis for lens-less projection is highly collimated illumination of a spatial light modulator. As shown collectively in FIGS. 2A-2C, solid-state laser diodes 202R, 202G and 202B are used as a light source 202. Though other pre-collimated light sources can be utilized with similar success (for example high-power super luminescent light emitting diodes). Typically, demonstrated is a full-color image formation engine with corresponding red, green and blue wavelengths of the light source 202 indicated by corresponding letters next to the identifier 202. Typically, the light source 202 have divergent beams with an elliptical shape due to a small active region, wherein the collimation optics is employed. Further shown, are first optical lenses (preferably, cylindrical lens) 204R, 204G and 204B is employed to collimate the laser beam of corresponding color on a fast axis which is diverging more rapidly. After this collimation, the collimated laser beams are combined on a common optical path by conventional dichroic beam-splitters (mirrors), 206A and 206B, wherein for example, the dichroic beam-splitter 206A combines red and green wavelengths, whereas the dichroic beam-splitter 206B adds a blue wavelength to the common optical path. After this, the collective laser beam bunch is collimated on the slow axis by a preferably cylindrical lens 208 to form a collimated light beam (such as, the incoming collimated light beam of FIG. 1). Notably, collimation lenses don't have to be necessarily cylindrical and may have other geometries compatible to the task of collimating and expanding laser beams to a certain size at the entrance of the first optical member 102.

The first optical member 102 expands and uniformizes illumination in one dimension and reflects (outputs) at a 90-degree angle in respect to the incoming beam direction. Then, the expanded and uniformized first collimated light beam 108 travels to the entrance of the second optical member 104. Preferably, optionally, the expanded and uniformized light 108 in the first beam direction prior to reaching the entrance surface of the second optical member goes through a half waveplate 112 (as shown in FIG. 2C). The second optical member 104 expands and uniformizes the intensity of the first collimated light beam 108 in the second beam direction, thus covering the whole 2D area of a spatial light modulator 114 with substantially uniform illumination. In operation, the second optical member 104 first directs predominantly linearly polarized light towards the LCOS-type spatial light modulator 114, which based on the pixel configuration (image) reflects back modulated in segments (pixels) light, which is either with the same polarization as the incident illumination beam or has orthogonal polarization. Furthermore, the second optical member 104 is configured to substantially loss-less pass through the orthogonally incident beam of polarized light. For example, if one considers the incident (illumination beam) produced by the second optical member 104 have the first polarization, the LCOS modulator 114 based on individual configuration of each pixel, an option to output via reflection either "on" pixels having a second polarization which is substantially orthogonal to the first polarization, or "off" pixels having the first polarization. Alternatively stated, in this example, a binary modulation is performed by the LCOS modulator 114. In such cases, the second optical member 104 is configured to pass through light with the second polarization P substantially without losses, whereas the light with the first polarization S is reflected back at a 90-degree angle and cannot be transmitted out in a normal direction to the active surface of the spatial light modulator 114. Furthermore, the thickness of the second optical member 104 typically is only few millimeters (mm). For example, 2, 3, 4, 4.5, 5, 6 mm, which is a much thinner footprint in comparison to conventional coupling beam-splitter. Moreover, as shown, if the LCOS modulator 114 has a square aspect ratio of 21×21 mm, the height of a polarizing beam splitter cube will be at least also 21 mm. In contrast, the second optical member 104 in this case would achieve the same functionality only at about 5.5 mm thickness. Also, it must be noted that the thickness of the second optical member 104 depends on the size (or footprint) of the spatial light modulator 114. Generally, the second optical member 104 is thicker with a larger surface area of the spatial light modulator 114.

Figure 3A:
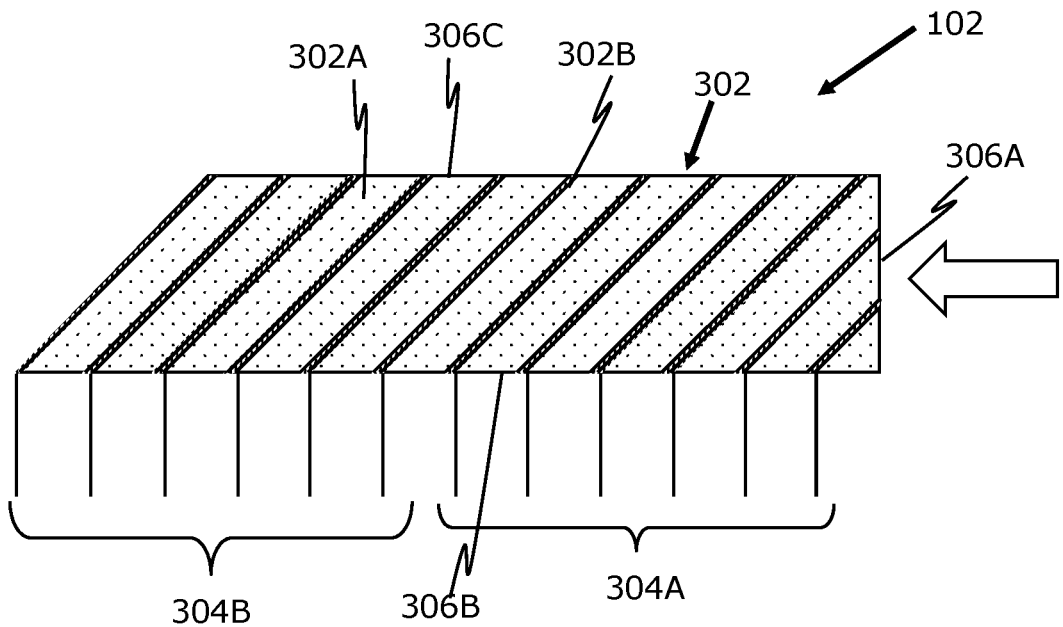
FIG. 3A is a schematic cross-sectional illustration of a first optical member for the optical arrangement of FIG. 1, in accordance with an embodiment of the present disclosure.

Referring to FIG. 3A, illustrated is a schematic drawing of a first optical member 102, in accordance with an embodiment of the present disclosure. As shown, the first optical member 102 comprises a first stack of layers 302 with a plurality of layers of a first type 302A and plurality of layers of a second type 302B, wherein every second layer is of the first type 302A and every other second layer is of the second type 302B in the first stack of layers 302, wherein the layers of the first type 302A in the first stack of layers 302 have a higher index of refraction as compared to the layers of the second type 302B in the first stack of layers 302. Moreover, the first stack of layers 302 have a first region 304A and a second region 304B defined therein, with the first region 304A being closer to face 306A of the first optical member 102 receiving the incident light beam and the second region 304B being farther to the said face of the first optical member 102 receiving the incident light beam as compared to the first region 304A, and wherein the layers of the second type 302B in the first region 304A have a first index of refraction and the layers of the second type 302B in the second region 304B have a second index of refraction, and wherein the first index of refraction is higher than the second index of refraction. In operation, the first type of layers 302A are glass slabs having index of refraction preferably around 1.65. The second type of layers 302B are thin bonding layers of optical polymer (for example, optical glue, optical adhesive, cement and the like). Furthermore, the thickness ratio between the first type of layers 302A and the second type of layers 302B is preferably around 100:1. In an example, in one of embodiments the thickness of first type of layers 302A is 400 micrometers, whereas the thickness of the second type of layers 302B is 4 micrometers. Furthermore, slabs of the first type of layers 302A and thus corresponding interfaces between the first type of layers 302A and the second type of layers 302B form 45-degree angle in respect to the incident light beam. Overall, the first optical member 102 is a planar optical element having cuboid geometry, wherein the first optical member 102 comprises a first input surface 306A, which is a light-entry surface, a second surface 306B which faces the input facet of the second optical member. The first input surface 306A is orthogonal to the second surface 306B and the third output surface 306C and wherein the second surface 306A is parallel to the third output surface 306C. The planar interfaces between the first type of layers 302A and the second type of layer 302B form a 45-degree angle with respect to the first input surface 306A, second surface 306B and the third output surface 306C.

Figure 3B:
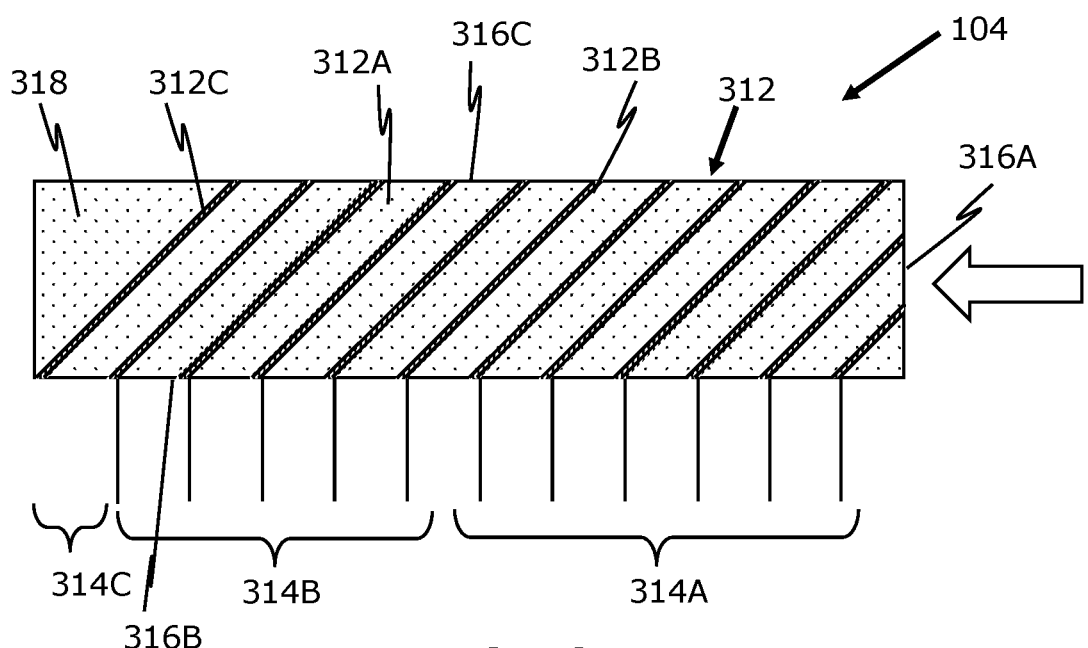
FIG. 3B is a schematic cross-sectional illustration of a second optical member for the optical arrangement of FIG. 1, in accordance with an embodiment of the present disclosure.

Referring to FIG. 3B, illustrated is a schematic drawing of a second optical member 104, in accordance with another embodiment of the present disclosure. As shown, the second optical member 104 comprises a second stack of layers 312 with a plurality of layers of a third type 312A and plurality of layers of a fourth type 312B, wherein every second layer is of the third type 312A and every other second layer is of the fourth type 312B in the second stack of layers 312, wherein the layers of the third type 312A in the second stack of layers 312 have a higher index of refraction as compared to the layers of the fourth type 312B in the second stack of layers 312. Moreover, the second stack of layers 312 has a third region 314A and a fourth region 314B defined therein, with the third region 314A being closer to face of the second optical member 104 receiving the incident light beam and the fourth region 314B being farther to the said face of the second optical member 104 receiving the incident light beam as compared to the third region 314A, and wherein the layers of the fourth type 312B in the third region 314A have a third index of refraction and the layers of the fourth type 312B in the fourth region 314B have a fourth index of refraction, and wherein the third index of refraction is higher than the fourth index of refraction. In operation, the third type of layers 312A typically are glass slabs having index of refraction preferably around 1.65. The fourth type of layers 312B are thin bonding layers of optical polymer (for example, optical glue, adhesive, or cement). Furthermore, the thickness ratio between the third type of layers 312A and the fourth type of layers 312B is preferably around 100:1. In an example, in one of the embodiments the thickness of third type of layers 312A is 400 micrometers, whereas the thickness of the fourth type of layers 312B is 4 micrometers. Furthermore, slabs of the third type of layers 312A and thus corresponding interfaces between the third type of layers 312A and the fourth type of layers 312B form 45-degree angle in respect to the incident light beam.

The second optical member comprises a third region 314C comprising a last interface layer 312C and an optical prism 318. Herein, the last interface layer 312C counting from an entry first surface 316A of the second optical member 104 is a fifth type of layer 312C different from the third and fourth type of layers 312A and 312B. The fifth type of layer 312C is composed of a polarization beam-splitting coating deposited on the compensation prism 318 and a thin optical adhesive layer which bonds the compensation prism with the functional coating of polarization sensitive beam splitter to the adjacent third type of layer 312A. It must be noted that the refractive index of the optical adhesive comprising the fifth type of layer 312C is substantially similar to that of the third type of layer 312A. Furthermore, the material of the compensation prism 318 is identical to that of the third type of layers 312A. Overall, the second optical member 104 is a planar optical element having cuboid geometry, wherein the second optical member 104 comprises a first input surface 316A, which is a light-entry surface, a second surface 316B which faces the spatial light modulator 114 and the third output surface 316C which faces the stack of optical diffuser elements (volumetric screen module). The first input surface 316A is orthogonal to the second surface 316B and the third output surface 316C and wherein the second surface 316A is parallel to the third output surface 316C. The planar interfaces between the third type of layers 312A and the fourth type of layers 312B, as well as the fifth type of layer 312C form a 45-degree angle with respect to the first input surface 316A, the second surface 316B and the third output surface 316C.

Figure 4:
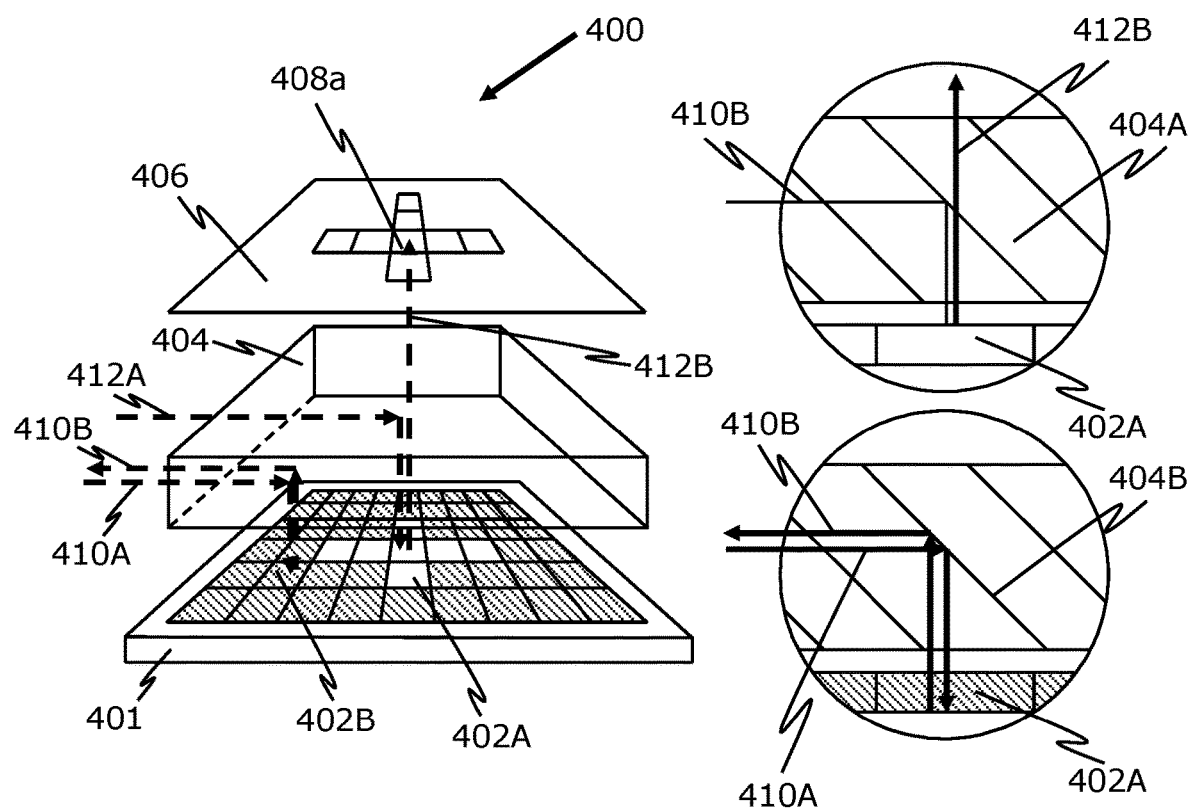
FIG. 4 is a schematic illustration of a display apparatus depicting image formation on a display member therein using the optical arrangement of FIG. 1, in accordance with various embodiments of the present disclosure.

Referring to FIG. 4, illustrated is a schematic illustration of a display apparatus 400, in accordance with various embodiments of the present disclosure. As shown, a LCOS spatial light modulator 401 is configured to output an image pattern comprised of "bright" pixels 402A and "dark" pixels 402B. Herein, as shown, the "bright" pixels 402A form a pattern of a cross. As the LCOS modulator 401 is reflective to visualize the pattern, the LCOS modulator 401 is externally illuminated. For this reason, two simplified optical paths will be considered, one that illuminates a "dark" pixel 402B and another that illuminates a "bright" pixel 402A. Herein, a light beam 410A enters the second optical member 404 (similar to the second optical member 104 of FIG. 1 or 3B), in which it is reflected by 90-degree angle and directed towards a "dark" pixel 402B of the LCOS modulator 401. The light beam 410B, as reflected from a "dark" pixel 402B, has predominantly similar polarization state as the incident beam 410A, which doesn't allow the light beam 410B to escape the second optical member 404 in a direct path. Instead, the light beam 410B corresponding to a "dark" pixel is partly reflected from the internal interface 404B (corresponding to the interface between the third type of layer and a fourth type of layers) and thereby partly transmitted. In actual implementation, the reflected light beam 410B encounters multiple interfaces between the third type of layers and a fourth type of layers prior to leaving the second optical member 404 i.e., essentially the light reflected form the "dark" pixels 402B is also pseudo uniformized and expanded across the surface of the second optical member 404 contributing to stray back-illumination interfering with the light of the "bright" pixels 402A facilitating contrast reduction. Thus, stray illumination from "dark" pixels 402B is required to be filtered by a polarization sensitive filter (not shown). That is, for example, a filter predominantly transmitting only the polarization corresponding to "bright" pixels, while absorbing or reflecting back orthogonal polarization (corresponding to "dark" pixels). Similarly, a light beam 412A illuminating the "bright" pixel 402A enters the second optical member 404, wherein it is reflected at a 90-degree angle towards the surface of the LCOS modulator 401 and towards the pixel 402A which is configured as "bright". Upon reflection from the bright pixel 402A, the reflected light beam 412B has an orthogonal polarization in respect to the incident beam 412A i.e., in the act of reflection from a bright pixel, the linear polarization of the light beam 412B has rotated by 90 degrees. Moreover, as a result, effectively the layer of liquid crystal at the site of a "bright" pixel 402A acts as a half-waveplate. The reflected light beam 412B corresponding to the "bright" pixel 402A is then transmitted through an internal surface 404A (i.e., an interface between the third type of layer and the fourth type of layer) out of the second optical member 404 and towards the optical diffuser element 406, on which the image of a "bright" pixel 408A is visualized or formed.

Figure 5:
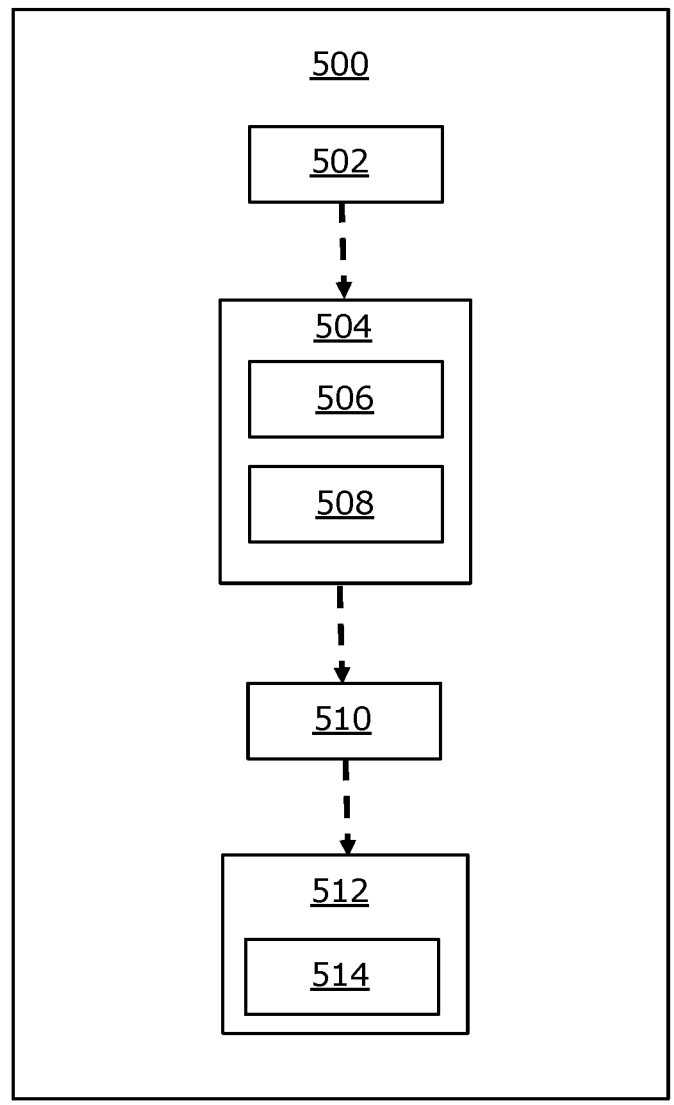
FIG. 5 is a block diagram illustration of a display apparatus, in accordance with various embodiments of the present disclosure.

Referring to FIG. 5, illustrated is a block diagram of a display apparatus, 500 in accordance with various embodiments of the present disclosure. As shown, the display apparatus 500 comprising a light source 502 configured to provide a collimated incoming light beam with a first polarization. Further, the display apparatus comprises an optical arrangement 504 (similar to the optical arrangement of FIG. 1). The optical arrangement 504 comprises a first optical member 506 arranged to receive the collimated incoming light beam, from an incoming beam direction, with a first polarization, the first optical member 506 configured to expand and uniformize the collimated incoming light beam along a first axis to form a first collimated light beam exiting therefrom in a first beam direction; and a second optical member 508 adapted to receive the first collimated light beam, from the first beam direction, with the first polarization in relation thereto, the second optical member configured to expand and uniformize the first collimated light beam along a second axis to form a second collimated light beam exiting therefrom in a second beam direction. Furthermore, the display apparatus 500 comprises a spatial light modulator 510 arranged to receive the second collimated light beam with the first polarization, the spatial light modulator 510 having one or more active pixels configured to reflect back the second collimated light beam in a direction opposite to the second beam direction with a second polarization, and one or more inactive pixels configured to reflect back the second collimated light beam in the direction opposite to the second beam direction with the first polarization. Furthermore, the display apparatus comprises a display member 512 arranged in the direction opposite to the second beam direction with respect to the spatial light modulator 510, wherein the second optical member 508 is configured to transmit the reflected back second collimated light beam from the one or more active pixels with the second polarization therethrough, and to reflect the reflected back second collimated light beam from the one or more inactive pixels with the first polarization, and wherein the display member 512 is configured to receive the transmitted second collimated light beam through the second optical member 504, to generate an image 514 thereat.

Figure 6:
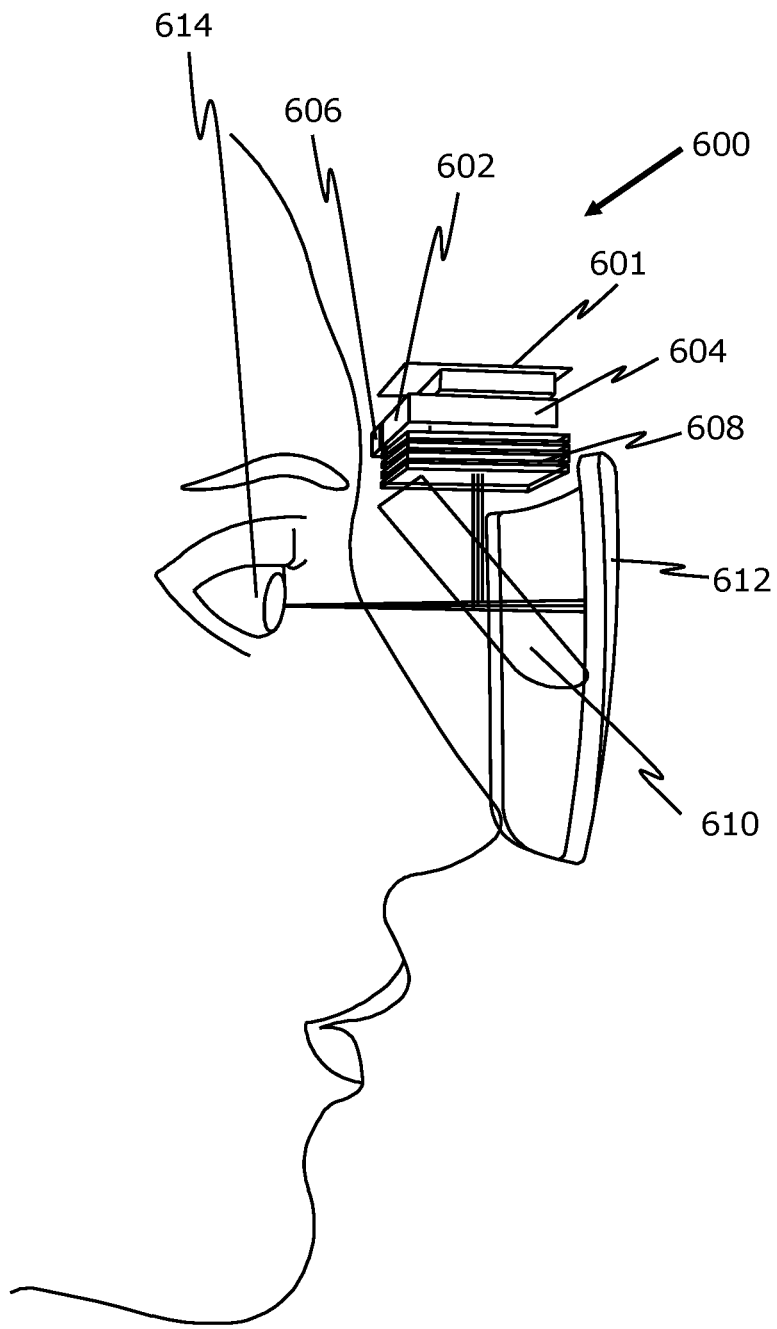
FIG. 6 is a schematic illustration of implementation of the display apparatus, in accordance with various embodiments of the present disclosure.

Referring to FIG. 6, illustrated is a schematic illustration of implementation of a display apparatus 600, in accordance with various embodiments of the present disclosure. Herein, the display apparatus primarily is utilized in near-to-eye displays such as, virtual and augmented reality displays. In the current implementation, the display apparatus 600 is shown as a multi-focal near-eye augmented reality display. As shown, the display apparatus 600 includes an LCOS spatial light modulator 601, a first optical member 602, a second optical member 604 and a light source 606. The display apparatus 600 forms an image, received by a stack of optical diffuser elements 608. In a multi-focal display architecture, the stack is formed by at least two switchable optical diffuser elements. The operation of the image formation by the LCOS modulator 601 and the switching of optical diffuser elements 608 within the stack is synchronized to accurately output corresponding image depth planes. In an augmented reality head-mounted display, the image formed on the diffuser elements 608 is magnified by an eyepiece. In the particular example, eyepiece is a part of an optical image combiner which known as a "bird-bath" combiner and is comprised of two beam-splitter components i.e., a flat beam splitter 610, and a curved beams splitter having optical power 612. The light from the diffuser elements first hits the flat beam splitter 610, which redirects a part of it towards the second beam splitter 612 which has a specified optical power. Further, a part of this light is reflected backwards and through the first beam splitter 610 and enters an observer's eye. Due to magnification by the reflective surface (mirror) having optical power of the second beam splitter 612, the observer perceives magnified virtual images of the optical diffuser elements 608 being arranged at different distances thus enabling re-accommodation of the eye between available focal distances.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical arrangement for expanding and uniformizing a beam of light, comprising:
    a first optical member arranged to receive a collimated incoming light beam, from an incoming beam direction, with a first polarization, the first optical member configured to expand and uniformize the collimated incoming light beam along a first axis to form a first collimated light beam exiting therefrom in a first beam direction; and
    a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction.

2. The optical arrangement according to claim 1, wherein:
    the first optical member comprising a first stack of layers with a plurality of layers of a first type and a plurality of layers of a second type, wherein every second layer is of the first type and every other second layer is of the second type in the first stack of layers; and
    the second optical member comprising a second stack of layers with a plurality of layers of a third type and plurality of layers of a fourth type, wherein every second layer is of the third type and every other second layer is of the fourth type in the second stack of layers.

3. The optical arrangement according to claim 2, wherein:
    the layers of the first type in the first stack of layers have a higher index of refraction as compared to the layers of the second type in the first stack of layers; and
    the layers of the third type in the second stack of layers have a higher index of refraction as compared to the layers of the fourth type in the second stack of layers.

4. The optical arrangement according to claim 2, wherein:
    the first stack of layers has a first region and a second region defined therein, with the first region being closer to face of the first optical member receiving the collimated incoming light beam and the second region being farther to the said face of the first optical member receiving the collimated incoming light beam as compared to the first region, and wherein the layers of the second type in the first region have a first index of refraction and the layers of the second type in the second region have a second index of refraction, and wherein the first index of refraction is higher than the second index of refraction; and
    the second stack of layers has a third region and a fourth region defined therein, with the third region being closer to face of the second optical member receiving the first collimated light beam and the fourth region being farther to the said face of the second optical member receiving the first collimated light beam as compared to the third region, and wherein the layers of the fourth type in the third region have a third index of refraction and the layers of the fourth type in the fourth region have a fourth index of refraction, and wherein the third index of refraction is higher than the fourth index of refraction.

5. The optical arrangement according to claim 2, wherein the second optical member further comprises an interface layer in a region farthest to face of the second optical member receiving the first collimated light beam, with the interface layer configured to reflect substantially the entire first collimated light beam with the first polarization received thereat and is transparent to light beam with a second polarization.

6. The optical arrangement according to claim 2, wherein:
    a ratio of thickness of each of the layers of the first type to each of the layers of the second type in the first optical member is in a range of 50:1 to 200:1; and
    a ratio of thickness of each of the layers of the third type to each of the layers of the fourth type in the second optical member is in a range of 50:1 to 200:1.

7. The optical arrangement according to claim 2, wherein the layers of the first type in the first optical member are substantially same as the layers of the third type in the second optical member, and the layers of the second type in the first optical member are substantially same as the layers of the fourth type in the second optical member.

8. The optical arrangement according to claim 2, wherein a normal vector to the layers of the third type and/or the fourth type in the second optical member and a normal vector to the layers of the first type and/or the second type in the first optical member form an angle of substantially 60 degrees therebetween.

9. The optical arrangement according to claim 1 further comprising a half-wave plate arranged between the first optical member and the second optical member, the half-wave plate configured to shift polarization direction of the first collimated light beam from the first polarization to an altered first polarization, wherein the second optical member is arranged with respect to the first optical member and the half-wave plate such that the first collimated light beam, from the half-wave plate, is received thereat with the first polarization in relation thereto.

10. The optical arrangement according to claim 1, wherein the incoming beam direction, the first beam direction and the second beam direction are orthogonal to each other.

11. A projector unit, comprising:
    a light source configured to provide a collimated incoming light beam with a first polarization;
    an optical arrangement comprising:
        a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
        a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction; and
    a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization,
    wherein the second optical member is configured to transmit the reflected back second collimated light beam from the one or more active pixels with the second polarization therethrough, and to reflect the reflected back second collimated light beam from the one or more inactive pixels with the first polarization.

12. The projector unit according to claim 11, wherein the optical arrangement comprises:
   a first optical member comprising a first stack of layers with a plurality of layers of a first type and a plurality of layers of a second type, wherein every second layer is of the first type and every other second layer is of the second type in the first stack of layers; and
   a second optical member comprising a second stack of layers with a plurality of layers of a third type and plurality of layers of a fourth type, wherein every second layer is of the third type and every other second layer is of the fourth type in the second stack of layers.

13. The projector unit according to claim 11 further comprising a polarization filter arranged next to the second optical member in respect to the reflected back second collimated light beam from the one or more inactive pixels with the first polarization, the polarization filter configured to filter the reflected back second collimated light beam from the one or more inactive pixels with the first polarization.

14. A display apparatus, comprising:
   a light source configured to provide a collimated incoming light beam with a first polarization;
   an optical arrangement comprising:
      a first optical member arranged to receive the collimated incoming light beam, from an incoming beam direction, with a first polarization, the first optical member configured to expand and uniformize the collimated incoming light beam along a first axis to form a first collimated light beam exiting therefrom in a first beam direction; and
      a second optical member adapted to receive the first collimated light beam, from the first beam direction, with the first polarization in relation thereto, the second optical member configured to expand and uniformize the first collimated light beam along a second axis to form a second collimated light beam exiting therefrom in a second beam direction;
   a spatial light modulator arranged to receive the second collimated light beam with the first polarization, the spatial light modulator having one or more active pixels configured to reflect back the second collimated light beam in a direction opposite to the second beam direction with a second polarization, and one or more inactive pixels configured to reflect back the second collimated light beam in the direction opposite to the second beam direction with the first polarization;
   a display member arranged in the direction opposite to the second beam direction with respect to the spatial light modulator,
   wherein the second optical member is configured to transmit the reflected back second collimated light beam from the one or more active pixels with the second polarization therethrough, and to reflect the reflected back second collimated light beam from the one or more inactive pixels with the first polarization, and
   wherein the display member is configured to receive the transmitted second collimated light beam through the second optical member, to generate an image thereat.

15. The display apparatus according to claim 14 wherein the optical arrangement is the optical arrangement.

16. The display apparatus according to claim 14 further comprising a polarization filter arranged between the second optical member and the display member, the polarization filter configured to filter the reflected back second collimated light beam from the one or more inactive pixels with the first polarization.

17. The display apparatus according to claim 14, wherein the display member comprises a stack of switchable optical diffuser elements, to generate the image with multiple depth planes.

18. The display apparatus according to claim 14 further comprising a magnifying eyepiece, wherein the magnifying eyepiece is at least one of:
   an optical lens;
   a bird bath image combiner;
   a freeform magnifying image combiner; or
   a combination of at least one of the optical lens and a flat beam splitter optical image combiner to provide a magnified view of the generated image to a user.

19. The display apparatus according to claim 14, wherein the display apparatus is a head-mounted near eye display.

20. The display apparatus according to claim 14, wherein the display apparatus is a head-up display.

* * * * *